United States Patent
Schroetz

(10) Patent No.: US 9,631,046 B2
(45) Date of Patent: Apr. 25, 2017

(54) FAST CURING AGENTS FOR EPDXY RESINS

(71) Applicant: Blue Cube IP LLC, Midland, MI (US)

(72) Inventor: Markus Schroetz, Ochsenhausen (DE)

(73) Assignee: BLUE CUBE IP LLC, Midland, MN (US)

( * ) Notice: Subject to any disclaimer, the term of this patent is extended or adjusted under 35 U.S.C. 154(b) by 0 days.

(21) Appl. No.: 14/408,077

(22) PCT Filed: Jul. 17, 2013

(86) PCT No.: PCT/US2013/050777
§ 371 (c)(1),
(2) Date: Dec. 15, 2014

(87) PCT Pub. No.: WO2014/028158
PCT Pub. Date: Feb. 20, 2014

(65) Prior Publication Data
US 2015/0175739 A1    Jun. 25, 2015

Related U.S. Application Data

(60) Provisional application No. 61/683,883, filed on Aug. 16, 2012.

(51) Int. Cl.
| | | |
|---|---|---|
| C08G 59/14 | (2006.01) | |
| C08G 59/18 | (2006.01) | |
| C08G 59/50 | (2006.01) | |
| C08G 59/68 | (2006.01) | |
| C08L 63/00 | (2006.01) | |
| C09D 5/00 | (2006.01) | |
| C09D 163/00 | (2006.01) | |

(52) U.S. Cl.
CPC ....... *C08G 59/1477* (2013.01); *C08G 59/184* (2013.01); *C08G 59/50* (2013.01); *C08G 59/685* (2013.01); *C08L 63/00* (2013.01); *C09D 5/002* (2013.01); *C09D 163/00* (2013.01)

(58) Field of Classification Search
CPC ............................ C08L 63/00; C08G 59/1477
USPC ........................................................ 523/428
See application file for complete search history.

(56) References Cited

U.S. PATENT DOCUMENTS

| | | | |
|---|---|---|---|
| 3,397,177 | A | 8/1968 | Stolton |
| 3,639,928 | A | 2/1972 | Bentley et al. |
| 4,229,563 | A | 10/1980 | Foscante et al. |
| 4,246,148 | A | 1/1981 | Shimp et al. |
| 4,264,758 | A | 4/1981 | Waddill |
| 2005/0176899 | A1 | 8/2005 | Volle |
| 2008/0287644 | A1 | 11/2008 | Hummel et al. |
| 2009/0061095 | A1 | 3/2009 | Parish |
| 2009/0118457 | A1 | 5/2009 | Gerber |
| 2010/0286345 | A1 | 11/2010 | Sato et al. |

FOREIGN PATENT DOCUMENTS

| | | |
|---|---|---|
| EP | 2028244 A1 | 2/2009 |
| GB | 868733 A | 5/1961 |
| WO | 2009080209 A1 | 7/2009 |

OTHER PUBLICATIONS

PCT/US2013/050777, Oct. 17, 2013, International Search Report and Written Opinion.
PCT/US2013/050777, Feb. 26, 2015 International Preliminary Report on Patentability.

*Primary Examiner* — Megan McCulley
(74) *Attorney, Agent, or Firm* — Polsinelli PC

(57) ABSTRACT

A hardener composition comprising a) an accelerator comprising a first amine at least partially neutralized by salicylic acid and a first modifier; b) a non-isolated adduct of i) a difunctional epoxy; and ii) a second amine; and c) a second modifier, and a process for making the hardener composition, are disclosed. The hardener can be used with an epoxy resin to form a curable composition.

13 Claims, 1 Drawing Sheet

US 9,631,046 B2

FAST CURING AGENTS FOR EPDXY RESINS

REFERENCE TO RELATED APPLICATIONS

The present application claims the benefit of U.S. Provisional Application No. 61/683,883, filed on Aug. 16, 2012.

BACKGROUND OF THE INVENTION

Field of the Invention

The present invention is related to fast curing agents for epoxy resins. Specifically, the present invention is related to VOC and (alkyl) phenol-free curing agents for epoxy resins.

Introduction

Cold curing epoxy systems are suitable for a wide range of industrial applications, such as floorings, mortars, adhesives, coatings, lacquers, and paints. Most of the cold curing amine hardeners contain benzyl alcohol as a modifier, which is a volatile organic compound (VOC) and causes emissions, even after curing the epoxy system.

To achieve both fast curing and chemical resistance, Mannich bases are normally used. Mannich bases can be formulated VOC-free, but are based on (alkyl) phenols, and are classified by the European Union's regulations as R 62 substances, bearing a "risk of impaired fertility".

Therefore, a need remains for components that can substitute for Mannich bases, in terms of technical performance. Mannich bases are used to achieve fast curing times and to produce chemical resistant coatings. Additionally, their surface appearance must be at least "fair," because although these coatings are not normally used as decorative coatings, they would lack interlayer adhesion otherwise.

SUMMARY OF THE INVENTION

In an embodiment of the present invention, there is disclosed a hardener composition comprising, consisting of, or consisting essentially of: a) an accelerator comprising a first amine at least partially neutralized by salicylic acid and a first modifier; b) a non-isolated adduct of i) a difunctional epoxy; and ii) a second amine; and c) a second modifier.

In another embodiment of the present invention, there is disclosed a process comprising, consisting of, or consisting essentially of: a) contacting a first modifier with salicylic acid to form a slurry; b) contacting a molar excess of a first amine with the slurry under reaction conditions to form an accelerator; c) admixing the accelerator with i) a non-isolated adduct of a difunctional epoxy and a second amine; and ii) a second modifier to form a hardener composition.

DETAILED DESCRIPTION OF THE INVENTION

Figure 1:
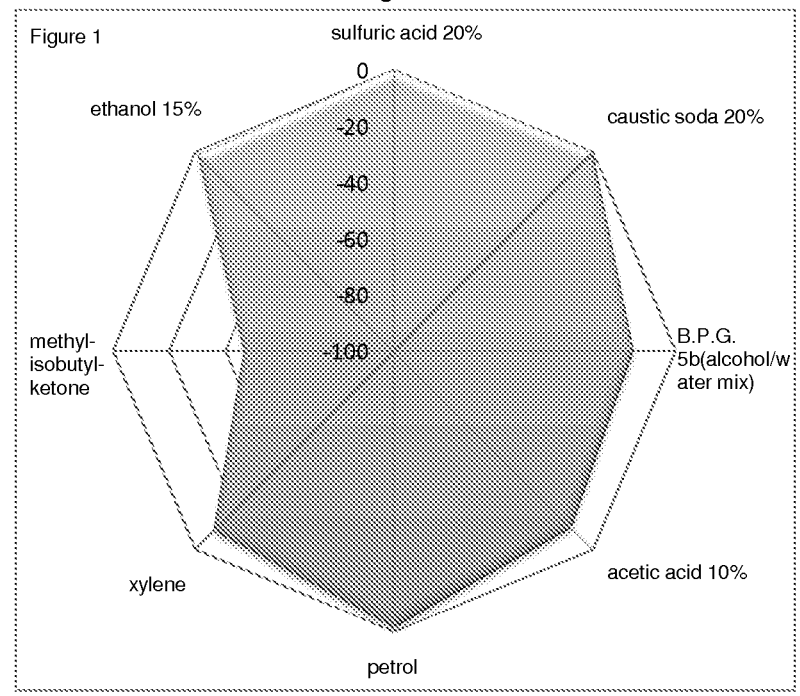
FIG. 1 is a visualization of values over a 7 day time period for the chemical resistance testing, the "umbrella size" is proportional to the chemical resistance, for the inventive formulation.

In an embodiment of the invention, there is disclosed a hardener composition comprising, consisting of or consisting essentially of: a) an accelerator comprising a first amine at least partially neutralized by salicylic acid and a first modifier; b) a non-isolated adduct of i) a difunctional epoxy; and ii) a second amine; and d) a second modifier.

Accelerator

In an embodiment, the accelerator comprises, consists of, or consists essentially of a first amine at least partially neutralized by salicylic acid and a first modifier.

The accelerator is generally present in the composition in the range of from 30 weight percent to 90 weight percent, based on the total weight of the composition. The accelerator is present in the composition in the range of from 40 weight percent to 80 weight percent in another embodiment, and is present in the range of from 50 weight percent to 70 weight percent in yet another embodiment.

In an embodiment, the first amine is cycloaliphatic. Examples of the first amine include, but are not limited to aromatic or araliphatic amines such as Methylendianiline (MDA), m-Xylylenediamine (MXDA) and their hydrogenated versions, 4-[(4-aminocyclohexyl)methyl]cyclohexan-1-amine (PACM) and 1,3-BAC.

The first amine is generally present in the accelerator in an amount in the range of from 20 weight percent to 80 weight percent, based on the total weight of the accelerator. The first amine is present in the accelerator in an amount in the range of from 30 weight percent to 70 weight percent in another embodiment, and in an amount in the range of from about 40 weight percent to 50 weight percent in yet another embodiment. Concentrations above 80 weight percent can make the coating sensitive to blushing or whitening. Concentrations below 20 weight percent can lead to unfavorably high viscosities and unfavorably high HEW (hydrogen equivalent weight). The first amine is at least partially neutralized by salicylic acid. In an embodiment, the neutralization process is carried out as follows: at slightly elevated temperatures (30-50° C.), the salicylic acid is added to the first modifier to form a slurry. A molar excess of a first amine is added, completely neutralizing the salicylic acid. The reaction temperature is maintained below 100° C.

Salicylic acid is generally present in the accelerator in an amount in the range of from 2 weight percent to 35 weight percent, based on the total weight of the accelerator. Salicylic acid is present in the accelerator in an amount in the range of from 10 weight percent to 30 weight percent in another embodiment, and is present in an amount in the range of from 15 weight percent to 25 weight percent in yet another embodiment.

Concentrations of salicylic acid above 35 weight percent can decrease the chemical resistance of the cured material. Concentrations below 2 weight percent can result in poor acceleration.

In an embodiment, the first modifier is a high-boiling solvent that does not contain any volatile organic compounds. Examples of the first modifier include, but are not limited to araliphatic phenols, (such as styrenated phenol), and Diisopropyl naphthalene (DI), branched or unbranched mid chain fatty alcohols having from 12 to 20 carbon atoms per molecule and mixtures thereof.

The first modifier is generally present in the accelerator in an amount in the range of from 10 weight percent to 50 weight percent, based on the total weight of the accelerator. The first modifier is present in the accelerator in an amount in the range of from about 20 weight percent to 40 weight percent in another embodiment, and in the range of from 25 weight percent to 35 weight percent in yet another embodiment.

Concentrations of the first modifier in amounts higher than 50 weight percent can weaken the network density and thus the mechanical strength. Concentrations of the first modifier less than 10 weight percent can lead to an unfavorably high viscosity.

Difunctional Epoxy and Second Amine

In an embodiment, one component of the composition is a non-isolated adduct of a difunctional epoxy i) and a second amine ii).

Examples of difunctional epoxies i) include but are not limited to bisphenol A or F diglycidylether, 1,4 butandiol diglycidylether, neopentyldiglycidylether, and 1,6-hexandiol diglycidylether.

Examples of the second amine ii) include but are not limited to aliphatic polyamines, arylaliphatic polyamines, cycloaliphatic polyamines, aromatic polyamines, heterocyclic polyamines, polyalkoxypolyamines, and combinations thereof. The alkoxy group of the polyalkoxypolyamines is an oxyethylene, oxypropylene, oxy-1,2-butylene, oxy-1,4-butylene or a co-polymer thereof.

Examples of aliphatic polyamines include, but are not limited to ethylenediamine (EDA), diethylenetriamine (DETA), triethylenetetramine (TETA), trimethyl hexane diamine (TMDA), hexamethylenediamine (HMDA), N-(2-aminoethyl)-1,3-propanediamine (N3-Amine), N,N'-1,2-ethanediylbis-1,3-propanediamine (N4-amine), and dipropylenetriamine. Examples of arylaliphatic polyamines include, but are not limited to m-xylylenediamine (MXDA), and p-xylylenediamine Examples of cycloaliphatic polyamines include, but are not limited to 1,3-bisaminocyclohexylamine (1,3-BAC), isophorone diamine (IPD), and 4,4'-methylenebiscyclohexanamine. Examples of aromatic polyamines include, but are not limited to m-phenylenediamine, diaminodiphenylmethane (DDM), and diaminodiphenylsulfone (DDS). Examples of heterocyclic polyamines include, but are not limited to N-aminoethylpiperazine (NAEP), and 3,9-bis(3-aminopropyl) 2,4,8,10-tetraoxaspiro (5,5)undecane. Examples of polyalkoxypolyamines where the alkoxy group is an oxyethylene, oxypropylene, oxy-1,2-butylene, oxy-1,4-butylene or a co-polymer thereof include, but are not limited to 4,7-dioxadecane-1,10-diamine, 1-propanamine,2,1-ethanediyloxy))bis(diaminopropylated diethylene glycol) (ANCAMINE® 1922A); poly(oxy(methyl-1,2-ethanediyl)), alpha-(2-aminomethylethyl)omega-(2-aminomethylethoxy) (JEFFAMINE® D-230, D-400); triethyleneglycoldiamine and oligomers (JEFFAMINE® XTJ-504, JEFFAMINE® XTJ-512), poly(oxy(methyl-1,2-ethanediyl)),alpha,alpha'-(oxydi-2,1-ethanediyl)bis(omega-(aminomethylethoxy)) (JEFFAMINE® XTJ-511); bis(3-aminopropyl)polytetrahydrofuran 350; bis(3-aminopropyl)polytetrahydrofuran 750; poly(oxy(methyl-1,2-ethanediyl)), a-hydro-w-(2-aminomethylethoxy) ether with 2-ethyl-2-(hydroxymethyl)-1,3-propanediol (JEFFAMINE® T-403), and diaminopropyl dipropylene glycol.

In an embodiment, the difunctional epoxy component i) is generally used in molar under-stochiometric amount compared to the second amine component ii) or up to a maximum molar ratio of 1:1, to ensure that component b) is an aminofunctional molecule with an unreacted amine.

Generally, one of ordinary skill in the art can determine the amount of non-isolated adduct a) to use in the hardener formulation. The nature of the second amine component ii) used and the degree of the reaction with difunctional epoxy component i) can strongly affects the viscosity of the adduct b). If adduct b) is highly viscous, then less can be used in the hardener formulation. If adduct b) has a lower viscosity, then more of the adduct can be used in the overall formulation.

In an embodiment, the non-isolated adduct is present in the composition in the range of from 1 weight percent to 75 weight percent, based on the total weight of the composition. The adduct is present in the composition in the range of from 5 weight percent to 75 weight percent in another embodiment, and from 1 weight percent to 25 weight percent in yet another embodiment.

Second Modifier

The composition can also include a second modifier. The second modifier is useful for dilution and may accelerate the curing speed in combination with epoxy resins. The second modifier can also enhance surface appearance.

Examples of the second modifier include, but are not limited to branched or linear, mid to long chain branched or unbranched fatty alcohols containing from 12 to 20 carbon atoms per molecule and mixtures thereof. Additional examples include polyethylene, propylene or butylene glycols, or mixtures thereof from 2 to 15 monomer units and their mono- and di-alkyl or aryl ethers.

The second modifier is generally present in a range of from 5 weight percent to 25 weight percent, based on the total weight of the composition.

Optional Components

Third Amine

In an embodiment, the composition can contain a third amine. The third amine can be any of the amines listed above. In an embodiment, the third amine can be IPD, TMD or poly(oxy(methyl-1,2-ethanediyl)), or alpha-(2-aminomethylethyl)omega-(2-aminomethylethoxy) (JEFFAMINE® D-230 or JEFFAMINE® D-400).

The third amine is generally present in an amount in the range of 1 weight percent to 50 weight percent, based on the total weight of the composition. In an embodiment, the third amine can be present in a range of from 10 weight percent to 75 weight percent, based on the total weight of the composition, and from 1 weight percent to 25 weight percent, based on the total weight of the composition in yet another embodiment.

Formulation Aids

In some embodiments of the present invention, defoamers and surfactants can be used as formulation aids.

Examples of defoamers include, but are not limited to TEGO Airex 944, Airex 950 from Evonik, Germany.

Examples of surfactants include, but are not limited to BYK 307 and BYK 333 form BYK-Chemie, Germany.

Process for Producing the Composition

In an embodiment of the present invention, there is disclosed a process comprising, consisting of, or consisting essentially of: a) contacting a first modifier with salicylic acid to form a slurry; b) contacting a molar excess of an first amine with said slurry to form an accelerator; c) admixing said accelerator with i) a non-isolated adduct of a difunctional epoxy and a second amine; and ii) a second modifier to form a hardener composition.

The accelerator component is produced by the following process:

The neutralization process occurs at slightly elevated temperatures (generally in the range of from 30 to 50° C.). The salicylic acid is added to the first modifier to form a slurry. A molar excess of the first amine is added, thereby completely neutralizing the salicylic acid, while maintaining the reaction temperature below 100° C. In an embodiment, about 50 mol % of the first amine is neutralized. In an embodiment, the formation of component b), the non-isolated adduct, takes place at elevated temperatures from 60 to 120° C. under reaction control by speed of addition. The addition speed depends mainly on the cooling power of the reactor used. In an embodiment, the temperature is in the range of from 75° C. to 85° C. The reactor is charged with the first amine and the difunctional epoxy is added from the top under stirring. After addition is finished, a post reaction of 20 to 40 minutes is performed. During the post reaction time the reaction between the difunctional epoxy and amine continues to completion, so that no unreacted epoxy remains in the reaction mixture.

The adduct is a non-isolated adduct. Once the reaction is completed, the adduct b) does not undergo an extra distillation step to remove any remaining unreacted amine component.

Once adduct b) is formed, the other components can be added in any combination or sub-combination.

Curable Composition Product

In an embodiment, a curable composition comprises, consists of, of consists essentially of: I) the above-described hardener and II) an epoxy resin.

In an embodiment, the epoxy resin is a liquid epoxy resin. Examples of liquid epoxy resins that can be used include, but are not limited to bisphenol-A diglycidyl ethers (BADGE), bisphenol-F diglycidyl ethers (BFDGE), and epoxy novolacs. In another embodiment, the epoxy resin can be a solid bisphenol A epoxy resin.

The curable composition can be optionally diluted with reactive diluents such as for example cresyl glycidyl ether (CGE), p. t.-butylphenyl glycidyl ether (ptBPGE), C12/C14 glycidyl ether, butanediol diglycidyl ether (BDDGE), hexanediol-diglycidyl ether (HDDGE), branched glycidyl ethers such as C13/15 alcohol glycidyl ether, and glycidyl esters such as Versatic Acid glycidyl esters.

In an embodiment, the hardener component and the epoxy resin are mixed according to the hardener equivalent weight (HEW) and epoxide equivalent weight (EEW) to ensure that 1 equivalent of epoxy reacts with 1 equivalent amine hydrogen.

The composition is then cured at ambient temperature.

These compositions are generally used as primers for concrete and floorings.

EXAMPLES

In the following Examples, various terms and designations used such as for example:

Polypox™ E 403: reactive diluted epoxy resin from UPPC:
  bisphenol A/F type with C12/C14 glycidyl ether
Polypox™ H 014: hardener from UPPC, Mannich base type, based on MXDA and ptBP diluted with TMD.

Testing Methods

"Pot life" as used herein refers to the period of time, at a given temperature, that a mixture of a resin component and a hardener component remains workable, as is understood by one having ordinary skill in the art. Pot life is the time a 100 gram mixture of resin/hardener needs to reach improper working viscosity. In a disposable cup, a steel wire with a coil on its lower end is moved up and down with moderate speed. As the mixture turns viscous in the course of the curing reaction, the cup will be lifted near the end point. The edge of the cup will touch then an electric switch, stopping a clock, defining the pot life.

Curable compositions are thermoanalyzed with a Mettler Toledo DSC822, available from Mettler-Toledo Inc., Columbus, Ohio, USA. The actual glass transition temperature ($Tg_A$) is measured in the range of 20° C. to 120° C. The potential glass transition temperature ($Tg_P$) is measured after a 10 minute postcuring at 180° C. in the range of 20° C. to 130° C. following Deutsches Institut für Normung (DIN German Institute for Standardization DIN 65467), at a heating rate of 15 K/minute.

Examples

The inventive hardener was made by blending the following:

60 parts BAC-SA accelerator, a neutralization product of salicylic acid and 1,3-BAC (1,3-Biscyclohexyldiamine) dissolved in styrenated phenol (Sanko SP-F, from Sanko)

15 parts of MXDA-LER Adduct, a reaction product of 4 moles MXDA (m-Xylendiamine, Mitsubishi Gas) with 1 mole DER™ 331, containing unreacted MXDA 15 parts TMD (Trimethylhexamethylendiamine, from Evonik Industries)

10 parts Lorol spezial (mixture of C12/C14 fatty alcohols, from Cognis/BASF, Germany)

The comparative example is a standard Mannich base type hardener, Polypox™ H 014.

Both hardener examples were used with Polypox™ E 403, a bisphenol A/bisphenol F epoxy resin, diluted with C12/C14 fatty alcohol glycidyl ether.

Technical values of the inventive and comparative examples are listed in Table 1, below.

TABLE 1

Technical Values

| Analysis Values | Inventive hardener I | Polypox™ H 014 (comparative) |
|---|---|---|
| H-Equivalent (g/equiv.) | 73 | 85 |
| Amine Number (mg KOH/g) | 395 | 355 |
| Pot life 100 g, 23° C. appr. (min) | 14 | 13 |
| Mix ratio (hardener/resin Polypox™ E 403) | 38:100 | 44:100 |
| Viscosity 25° C. (mPas) | 800 | 693 |
| Refractive index | 1.5347 | 1.5486 |
| Color Number (Gardner) | 0.8 | 0.5 |
| Glass transition temperature (° C.) $Tg_P$ (DSC) 180° C., 10 min 25° C.-150° C., 10° C./min | 67 | 62 |

The Shore D hardness development and visual inspection is shown in Table 2, below.

TABLE 2

Shore D hardness development and visual inspection

| | Inventive hardener I | Polypox™ H 014 (comparative) |
|---|---|---|
| Shore-D 23° C. 50% relative humidity | | |
| 4 h | 58 | 62 |
| 6 h | 68 | 70 |
| 8 h | 70 | 72 |
| 24 h | 73 | 75 |
| 48 h | 75 | 75 |
| 7 d | 74 | 75 |
| Surface | No carbamate | No carbamate |
| Shore-D 13° C., 80% relative humidity | | |
| 6 h | 35 | 39 |
| 8 h | 55 | 60 |

TABLE 2-continued

Shore D hardness development and visual inspection

|  | Inventive hardener I | Polypox ™ H 014 (comparative) |
|---|---|---|
| 24 h | 74 | 72 |
| 48 h | 72 | 72 |
| 7 d | 74 | 72 |
| Surface | Mild carbamate | Carbamate |

The pendulum hardness values according to Koenig, 200 μm are found in Table 3, below. This was for a 200 μm layer on glass plates with the values given in seconds.

TABLE 3

Pendulum Hardness Values

|  | Inventive hardener I | Polypox ™ H 014 (comparative) |
|---|---|---|
| 23° C., 50% relative humidity |  |  |
| 4 h | 15 | 23 |
| 6 h | 47 | 72 |
| 8 h | 67 | 96 |
| 13° C., 80% relative humidity |  |  |
| 6 h | 2 | 9 |
| 8 h | 8 | 19 |

Chemical Resistance Comparison

After homogenization of both components (the inventive or comparative hardener with Polypox™ E 403 epoxy resin) for 2 minutes, the liquid mixture was poured into molds, so that the film thickness was 3 mm and was cured for 7 days at room temperature.

Figure 2:
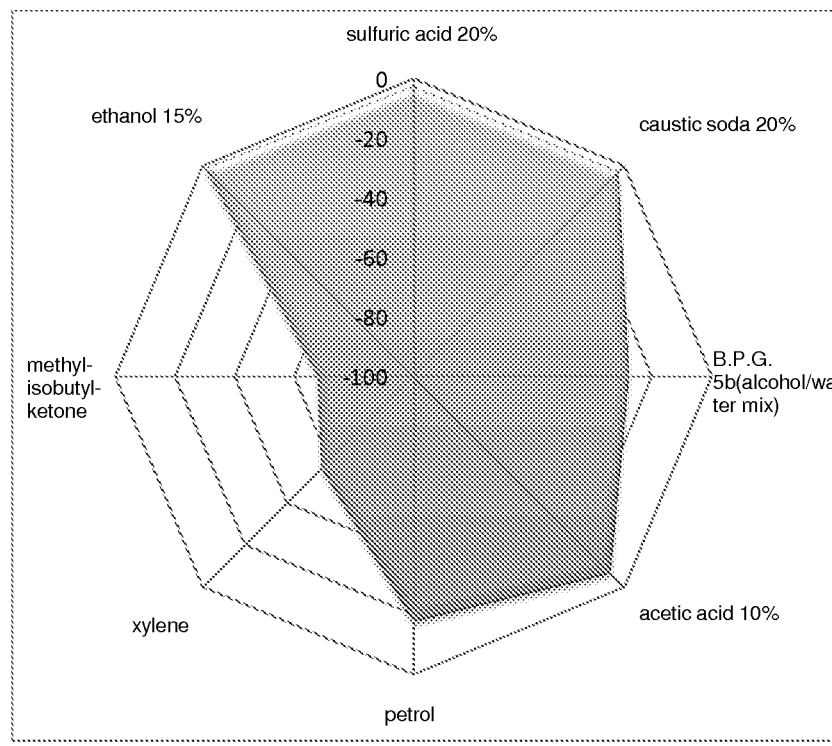
FIG. 2 is a visualization of values over a 7 day time period for the chemical resistance testing, the "umbrella size" is proportional to the chemical resistance, for the comparative formulation.

These films were tested by exposing them to different solutions for 7 days (168 hours) by placing a cotton pad that is saturated with the solution on the sample and covering the pad and sample. After 1 day (24 hours) of exposure, 2 days (48 hours) of exposure, and 7 days of exposure the Shore D hardness of the samples was measured. The Shore D hardness measurements are shown in FIGS. 1 and 2, and in Tables 4-6.

The percent change in Shore D hardness, as shown as percent % Δ, was determined with the initial hardness and the final hardness after 168 hours of exposure to the solutions. The percent change in Shore D hardness was calculated as (1−(final hardness/initial hardness))*100, where a negative percent change in hardness indicated a greater value for initial hardness than final hardness.

The test liquids were acetic acid, sulfuric acid, sodium hydroxide, gasoline, B.P.G. 5b, xylene, and methylisobutylketone (MIBK). Specific compounds are listed below:

Acetic acid, analytical grade, available from Merck KGaA

Sulfuric acid, analytical grade, available from Merck KGaA

Sodium hydroxide, analytical grade, available from Merck KGaA

Bau- und Prüfgrundsätze Gruppe 5b of the DIBT (Policy for Construction and Testing Group 5b of the German Institute for Construction Technique) (hereinafter designated as 'B.P.G. 5b'), a mixture of 48 volume percent methanol, analytical grade, available from Merck KGaA, 48 volume percent isopropanol, analytical grade, available from Merck KGaA, and 4 volume percent water Gasoline, available from Esso (Exxon)

Xylene, analytical grade, available from Merck KGaA

Ethanol, available from Merck KGaA

Methylisobutylketone (MIBK), analytical grade, available from Merck KGaA

The results are shown in Tables 4-6, below. They are also shown in FIG. 1, for the inventive formulation, and in FIG. 2 for the comparative formulation.

TABLE 4

Results after 1 day

| Test liquid | Shore D relative decrease after 1 day (%) Inventive hardener I | Shore D relative decrease after 1 day (%) Polypox ™ H 014 (comparative) |
|---|---|---|
| Sulfuric acid 20% | 0.0 | −1.3 |
| NaOH 20% | 0.0 | −1.3 |
| B.P.G. 5b | −4.0 | −11.3 |
| Acetic acid 10% | −4.0 | −3.8 |
| Gasoline | −1.3 | −6.3 |
| Xylene | −2.7 | −17.9 |
| MIBK | −14.7 | −26.7 |
| Ethanol 15% | 0.0 | −1.3 |

TABLE 5

Results after 2 days

| Test liquid | Shore D relative decrease after 2 days (%) Inventive hardener I | Shore D relative decrease after 2 days (%) Polypox ™ H 014 (comparative) |
|---|---|---|
| Sulfuric acid 20% | 0.0 | −2.6 |
| NaOH 20% | 0.0 | −1.3 |
| B.P.G. 5b | −8.0 | −16.3 |
| Acetic acid 10% | −5.3 | −3.8 |
| Gasoline | −1.3 | −8.8 |
| Xylene | −2.7 | −29.5 |
| MIBK | −24.0 | −40.0 |
| Ethanol 15% | 0.0 | −1.3 |

TABLE 6

Results after 7 days

| Test liquid | Shore D relative decrease after 7 days (%) Inventive hardener I | Shore D relative decrease after 7 days (%) Polypox ™ H 014 (comparative) |
|---|---|---|
| Sulfuric acid 20% | 0.0 | −2.5 |
| NaOH 20% | 0.0 | −2.5 |
| B.P.G. 5b | −14.7 | −27.5 |
| Acetic acid 10% | −10.7 | −6.3 |
| Gasoline | −1.3 | −17.5 |
| Xylene | −9.3 | −56.4 |
| MIBK | −46.7 | −68.0 |
| Ethanol 15% | −1.3 | −1.3 |

What is claimed is:
1. A hardener composition comprising:
   a) an accelerator comprising a first amine at least partially neutralized by salicylic acid and a first modifier; wherein said first modifier is styrenated phenol;
   b) a non-isolated adduct of
      i). a difunctional epoxy and
      ii). a second amine;

c) a second modifier;
wherein the second modifier is a branched or unbranched mid chain fatty alcohols having from 12 to 20 carbon atoms per molecule and mixtures thereof or polyethylene, propylene or butylene glycols, or mixtures thereof from 2 to 15 monomer units and their mono- and di- alkyl or aryl ethers; and
d) a third amine.

2. A hardener composition in accordance with claim 1 of the preceding claims wherein said difunctional epoxy is selected from the group consisting of bisphenol A diglycidylether, bisphenol F diglycidylether, and mixtures thereof.

3. A hardener composition in accordance with claim 1 of the preceding claims wherein said first amine is cycloaliphatic.

4. A hardener composition in accordance with claim 1 of the preceding claims wherein said second amine is an araliphatic polyamine.

5. A hardener composition in accordance with claim 1 wherein the accelerator is present in an amount in the range of from 30 weight percent to 90 weight percent, the non-isolated adduct is present in an amount in the range of from 1 weight percent to 75 weight percent, and the second modifier is present in an amount in the range of from 5 weight percent to 25 weight percent, based on the total weight of the composition.

6. A curable composition comprising:
I) the hardener composition of claim 1; and
II) an epoxy resin selected from the group consisting of liquid bisphenol-A diglycidyl ethers, liquid bisphenol-F diglycidyl ethers, liquid epoxy novolacs, solid bisphenol-A, and combinations thereof.

7. A primer prepared using the curable composition of claim 6.

8. A process comprising:
a) contacting a first modifier with salicylic acid to form a slurry; wherein the first modifier is styrenated phenol;
b) contacting a molar excess of a first amine with the slurry under reaction conditions to form an accelerator; and
c) admixing the accelerator with
 i) a non-isolated adduct of a difunctional epoxy and a second amine; and
 ii) a second modifier; wherein the second modifier is selected from the group consisting of branched or unbranched mid chain fatty alcohols having from 12 to 20 carbon atoms per molecule and mixtures thereof or polyethylene, propylene or butylene glycols, or mixtures thereof from 2 to 15 monomer units and their mono- and di- alkyl or aryl ethers to form a hardener composition; and
 iii) a third amine.

9. A process in accordance with claim 8 wherein said reaction conditions include a reaction temperature of under 100° C.

10. A process in accordance with claim 8 wherein said first modifier and said second modifier are selected from the group consisting of araliphtic phenols, branched or unbranched mid chain fatty alcohols having from 12 to 20 carbon atoms per molecule and mixtures thereof.

11. A process in accordance with claim 8 wherein said difunctional epoxy is selected from the group consisting of bisphenol A diglycidylether, bisphenol F diglycidylether, and mixtures thereof.

12. A process in accordance with claim 8 wherein said first amine is cycloaliphatic.

13. A process in accordance with claim 8 wherein said second amine is an araliphatic polyamine.

* * * * *

UNITED STATES PATENT AND TRADEMARK OFFICE
CERTIFICATE OF CORRECTION

PATENT NO.        : 9,631,046 B2
APPLICATION NO.   : 14/408077
DATED             : April 25, 2017
INVENTOR(S)       : Markus Schroetz Page 1 of 1

It is certified that error appears in the above-identified patent and that said Letters Patent is hereby corrected as shown below:

On the Title Page

In the title, delete the word "EPDXY" and replace it with -- EPOXY --.

Signed and Sealed this
Twenty-sixth Day of June, 2018

Andrei Iancu
*Director of the United States Patent and Trademark Office*